Sept. 24, 1940. W. C. HARPER 2,215,611
BAKING PAN
Filed March 26, 1940
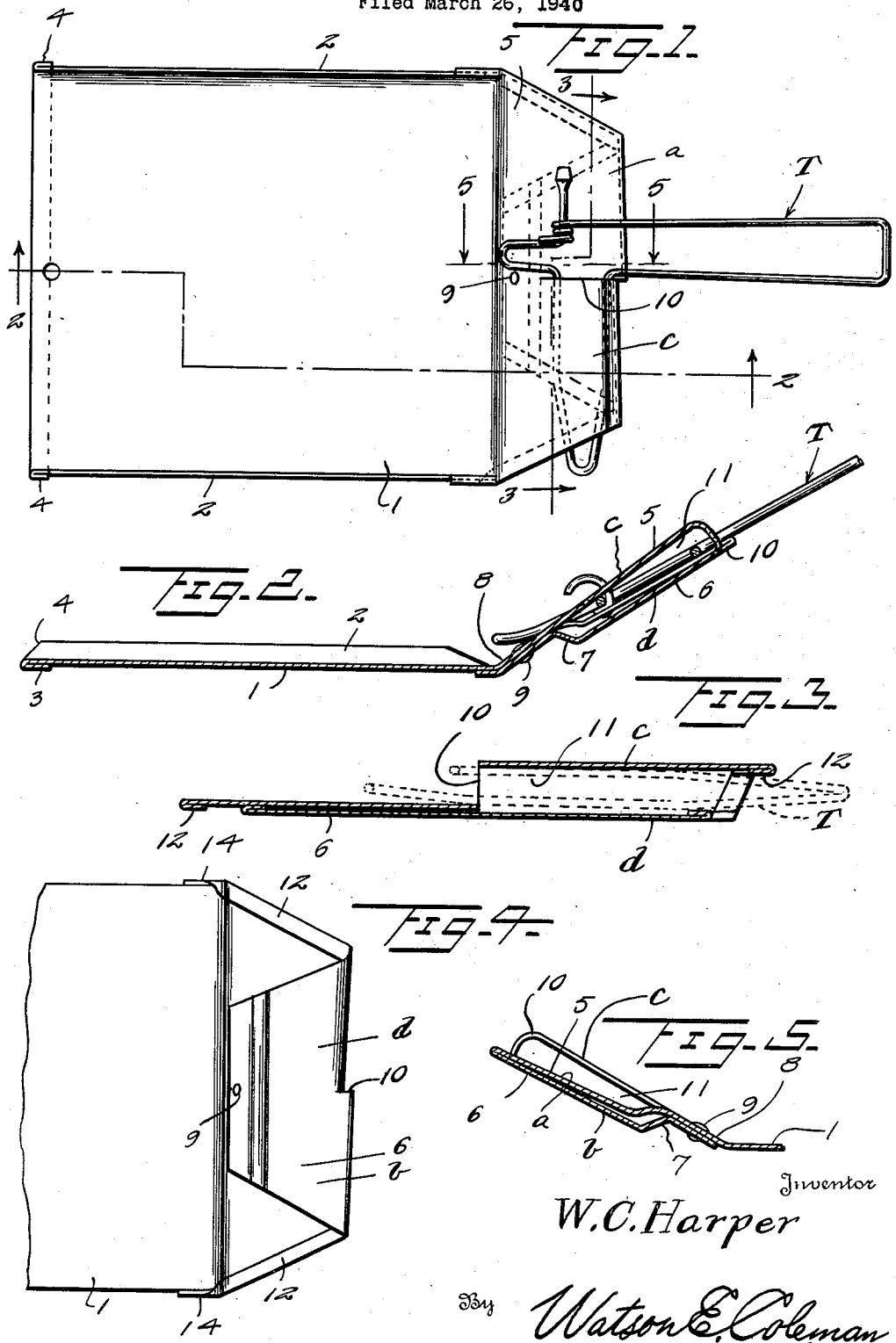
Inventor
W.C.Harper
By Watson E. Coleman
Attorney Patented Sept. 24, 1940

2,215,611

UNITED STATES PATENT OFFICE 2,215,611

BAKING PAN

William C. Harper, Brookneal, Va.

Application March 26, 1940, Serial No. 326,107

1 Claim. (Cl. 53—6)

This invention relates to a baking pan and has relation more particularly to a device of this kind especially designed and adapted for use in the baking of biscuits and the like.

It is a particular object of the invention to provide a pan of this kind whereby the same may be readily placed within or removed from an oven and in a manner whereby the pan may be conveniently manipulated without injury to the person.

The invention consists in the details of construction and in the combination and arrangement of the several parts of my improved baking pan whereby certain important advantages are attained and the article rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view in top plan of a baking pan constructed in accordance with an embodiment of my invention with a lifter applied thereto;

Figure 2 is a sectional view taken substantially on the line 2—2 of Figure 1;

Figure 3 is a sectional view taken substantially on the line 3—3 of Figure 1;

Figure 4 is a fragmentary view in bottom plan of the rear end portion of the pan as illustrated in Figure 1;

Figure 5 is a fragmentary detailed sectional view taken substantially on the line 5—5 of Figure 1.

As disclosed in the accompanying drawing, my improved pan comprises a bottom plate 1 of metal of desired gauge. The plate 1 is strengthened by the upstanding flanges 2 disposed along the side marginal portions thereof and the forward or front end of the plate 1 is reinforced by the reverted flange 3 having close contact from below with the plate 1. This flange 3 is also extended, as at 4, to overlie the outer face of the flanges 2 in close contact therewith to reinforce said end portions of the flanges.

The rear end of the plate 1 is continued by an upwardly and outwardly inclined extension or apron 5 continued by a returned portion 6. This returned portion 6 has its outer part inwardly offset, as at 7, so that the outer portion 8 thereof has close contact with the inner or lower portion of the extension or apron 5 and is securely fastened thereto by a rivet 9 or the like.

The outer portion of the extension or apron 5 is provided with a cut 10 disposed in a direction lengthwise of the plate 1 and for a distance inwardly of the extension or apron 5 beyond its center.

The portion $a$ to one side of the cut 10 is pressed down in substantially close relation to the adjacent portion $b$ of the reverted or returned portion 6. The portion $c$ of the extension or apron 5 at the opposite side of the cut 10 is spaced from the adjacent part $d$ of the returned portion 6 resulting in the formation of a socket 11 open at both ends and disposed in a direction transversely of the plate 1.

While the extension or apron 5 with its returned portion 6 may in many cases be readily grasped by the person to facilitate the application or removal of the pan with respect to an oven or the like, yet to further facilitate the handling of the pan a suitable tool or implement T is engaged within the socket 11 whereby the pan either empty or with its load may be readily handled. The tool T may be of any kind preferred although it is to be stated that the tool as illustrated in the accompanying drawing is of a type which is particularly described and claimed in a co-pending application Serial No. 326,108, filed March 26, 1940.

To strengthen the extension or apron 5, the side marginal portions thereof are provided with the reverted portions 12 in close contact therewith from below and such reverted portions are extended for a slight distance, as at 14, along the adjacent ends of the flanges 2.

From the foregoing description it is thought to be obvious that a baking pan constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

As a new article of manufacture, a baking pan comprising a plate having an upwardly and outwardly disposed extension at one end portion, said extension being continued by a returned portion, the extension and returned portion at one side of the plate being in substantially close contact, said extension and returned portion at the opposite side of the plate being spaced apart to provide a socket to receive a lifting member.

WILLIAM C. HARPER.